United States Patent [19]

Witman

[11] 4,378,449
[45] Mar. 29, 1983

[54] IMPACT MODIFIED POLYCARBONATES

[75] Inventor: Mark W. Witman, New Martinsville, W. Va.

[73] Assignee: Mobay Chemical Corporation, Pittsburgh, Pa.

[21] Appl. No.: 304,397

[22] Filed: Sep. 21, 1981

Related U.S. Application Data

[63] Continuation-in-part of Ser. No. 130,288, Mar. 14, 1980, Pat. No. 4,299,928.

[51] Int. Cl.$^3$ .................... C08L 51/00; C08L 69/00
[52] U.S. Cl. .................................... 525/67; 525/63; 525/69
[58] Field of Search ...................... 525/67, 68, 69

[56] References Cited

U.S. PATENT DOCUMENTS

| | | | |
|---|---|---|---|
| 3,655,824 | 4/1972 | Kato et al. | 260/873 |
| 3,891,719 | 6/1975 | Schirmer et al. | 260/873 |
| 4,243,575 | 1/1981 | Myers et al. | 260/37 PC |
| 4,245,058 | 1/1981 | Liu | 525/148 |
| 4,251,647 | 2/1981 | Liu | 525/91 |
| 4,257,937 | 3/1981 | Cohen et al. | 260/40 R |
| 4,260,693 | 4/1981 | Liu | 525/148 |
| 4,263,415 | 4/1981 | Liu | 525/148 |
| 4,263,416 | 4/1981 | Liu et al. | 525/148 |
| 4,299,928 | 10/1981 | Witman | 525/68 |

OTHER PUBLICATIONS

*The Condensed Chemical Dictionary*, 9th Edition, Van Nostrand Reinhold Co., p. 227.

*Primary Examiner*—J. Ziegler
*Attorney, Agent, or Firm*—Gene Harsh; Lawrence S. Pope; Aron Preis

[57] ABSTRACT

Polycarbonates having improved impact performance are provided, comprising a blend of polycarbonate resin and an acrylic rubber interpolymer composite.

9 Claims, No Drawings

IMPACT MODIFIED POLYCARBONATES

This application is a continuation-in-part of my co-pending application Ser. No. 130,288 filed Mar. 14, 1980 now U.S. Pat. No. 4,299,928, issued Nov. 10, 1981.

BACKGROUND OF THE INVENTION

1. Field of the Invention

This invention relates to polycarbonates and more particularly to polycarbonates having improved impact performance.

2. Description of the Prior Art

Polycarbonates derived from reactions involving organic dihydroxy compounds and carbonic acid derivatives have found extensive commercial applications because of their excellent mechanical and physical properties. These thermoplastic polymers are particularly suited for molding articles for which impact strength, rigidity, toughness, thermal and dimensional stability as well as excellent electrical properties are required.

It is known that polycarbonates exhibit high notched Izod (ASTM test D-256) impact values. These values, about 16 ft-lbs/in., associated with failure in a ductile mode, are characteristic of test specimens thinner than about one-eighth inch. Thicker specimens, i.e. one-fourth inch, fail in a brittle fashion at about 2.5 ft-lbs/in.

Impact strength dependence on thickness gives rise to "critical thickness", a material parameter defined as that thickness at which a discontinuity occurs in the graphical representation of impact strength vs. specimen thickness. For example, polycarbonate based on bisphenol A, having a melt flow rate of 3 to 6 grams/10 minutes at 300° C. (ASTM D 1238) exhibit a discontinuity at about 5.71 mm (225 mils). Articles of this material thinner than 225 mils will show ductile failure upon impact while thicker ones will fail in a brittle fashion.

This dependence of impact performance on thickness represents a drawback because it tends to limit the utility of polycarbonates by imposing restrictions on the design of molded articles.

One approach to solving the critical thickness problem has been by incorporation of polyolefin into the polycarbonate resin (see U.S. Pat. No. 3,437,631). Another approach, taught by U.S. Pat. No. 4,043,980, entails the introduction of sulfur containing aromatic diols into the polycarbonate chain. Neither of these approaches is completely satisfactory as they tend to compromise some other important characteristics of polycarbonate resins. Acrylic rubber interpolymer composites have been suggested as impact modifiers of certain thermoplastic materials. These multiphase compounds have been disclosed in U.S. Pat. No. 3,808,180 as impact modifiers of vinyl halides and acrylic polymers and in U.S. Pat. No. 4,096,202 as modifiers of poly(alkylene terephthalates).

BRIEF DESCRIPTION OF THE INVENTION

It is an object of the invention to provide a polycarbonate of improved impact performance. Another object is to provide a process for such improvement without significantly effecting the other characteristics of polycarbonates. These objects are achieved by the present invention which teaches a blend of about 80 to 99 percent by weight of polycarbonate resin and about 1 to 20 percent by weight of acrylic rubber interpolymer composite comprising about 25 to 95 percent by weight of an elastomeric phase and about 75 to 5 percent by weight of a rigid thermoplastic phase.

Also improved by the incorporation of acrylic rubber interpolymer is the impact performance of polycarbonate molding compositions that contain fire retardants and mold release agents.

DETAILED DESCRIPTION OF THE INVENTION

When used herein, the term "polycarbonate resin" means the neat resin without additives; "polycarbonate" means the polycarbonate resin with additives incorporated therein. The polycarbonate resins of the invention may be prepared by conventional methods of preparation for polycarbonate resins and may have a weight average molecular weight of 10,000 to 200,000 and preferably a melt flow rate of 1 to 24 grams/10 minutes at 300° C. (ASTM D-1238).

Any suitable processes, reactants, catalysts, solvent conditions and the like for the production of polycarbonate resins of this invention which are customarily employed in polycarbonate resin syntheses may be used, such as disclosed in German Pat. Nos. 1,046,311 and 962,274 and U.S. Pat. Nos. 3,248,414; 3,153,008; 3,215,668; 3,187,065; 3,028,365; 2,999,846; 2,964,974; 2,970,137; 2,991,273 and 2,999,835, all incorporated herein by reference. The preferred process is the interfacial polycondensation process.

According to the interfacial polycondensation process, polycarbonate resins are obtained by reacting the aromatic dihydroxy compounds with an alkali metal hydroxide or alkaline earth metal oxide or hydroxide to form the salt of the hydroxy compounds. The salt mixture is present in an aqueous solution or suspension and is reacted with phosgene, carbonyl bromide or bis-chloroformic esters of the aromatic dihydroxy compounds. An organic solvent is provided in the reaction admixture which is a solvent for the polymer but not for the aromatic dihydroxy salts. Thus, chlorinated aliphatic hydrocarbons or chlorinated aromatic hydrocarbons are used as the organic solvent which dissolves the condensation product. In order to limit the molecular weight one may use monofunctional reactants such as monophenols, for example the propyl-, isopropyl- and butyl-phenols, especially p-tert.-butylphenol and phenol itself. In order to accelerate the reaction, catalysts such as tertiary amines, quaternary ammonium, phosphonium or arsonium salts and the like may be used. The reaction temperature should be about −20° to +150° C., preferably 0° C. to about 100° C.

According to the polycondensation process in a homogeneous phase, the dissolved reaction components are polycondensed in an inert solvent in the presence of an equivalent amount of a tertiary amine base required for absorption of the generated HCl, such as e.g. N,N-dimethyl-aniline, N,N-dimethyl-cyclohexylamine or preferably pyridine and the like. In still another process, a diaryl carbonate can be transesterified with the aromatic dihydroxy compounds to form the polycarbonate resin.

It is to be understood that it is possible to combine in the processes described above in a chemically meaningful way, both the aromatic dihydroxy compounds and the monohydroxy compounds in the form of the alkali metal salts and/or bis-haloformic acid esters, and the amount of phosgene or carbonyl bromide then still required in order to obtain high molecular weight products. Other methods of synthesis in forming the polycarbonates of the invention such as disclosed in U.S. Pat. No. 3,912,688, incorporated herein by reference, may be used.

The aromatic polycarbonates can be branched by incorporating small amounts, i.e. between 0.05 and 2.0 mol percent (relative to the amount of diphenols) of compounds which are trifunctional or more than trifunctional, in particular those with three or more phenolic hydroxyl groups.

Polycarbonates of this type are described, for example, in DOS (German published specifications) Nos. 1,570,533; 1,595,762; 2,116,974; 2,113,347 and 2,500,092, in British Pat. Specification No. 1,079,821 and in U.S. Pat. No. 3,511,514.

Examples of some of the compounds which have three or more phenolic hydroxyl groups and which can be used are phloroglucinol, 4,4-dimethyl-2,4,6-tri-(4-hydroxyphenyl)-hept-2-ane, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]propane, 2,4-bis (4-hydroxy-phenylisopropyl)-phenyl-2,6-bis-(2-hydroxy-5'-methyl-benzyl)-4-methylphenol, 2-(4-hydroxyphenyl)-2-(2,4-dihydroxyphenyl)-propane and 1,4-bis-(4,4''-dihydroxy-triphenylmethyl)-benzene. Other suitable trifunctional compounds are 2,4-dihydroxybenzoic acid, trimesic acid, cyanuric chloride, 3,3-bis-(4-hydroxyphenyl)-2-oxo-2,3-dihydroindole and 3,3-bis-(3-methyl-4-hydroxyphenyl)-2-oxo-2,3-dihydroindole.

Acrylic rubber interpolymer composites are described in U.S. Pat. Nos. 3,808,180 and 4,096,202, both incorporated by reference herein. Briefly, the technology described therein is that of the preparation of a specific class of multiphase compounds. These are compositions comprising about 25 to 95 percent by weight of a first elastomeric phase and about 75 to 5 percent by weight of a second, rigid, thermoplastic phase. The first phase is polymerized from about 75 to 99.8 percent by weight $C_1$ to $C_6$ acrylate resulting in an acrylic rubber core having a glass transition temperature below about 10° C. which is cross-linked with 0.1 to 5 percent by weight of a cross-linking monomer and to which is added 0.1 to 5 percent by weight of a graft-linking monomer.

The preferred alkyl acrylate is butyl acrylate. The cross-linking monomer is a polyethylenically unsaturated monomer having a plurality of addition polymerizable reactive groups all of which polymerize at substantially the same rate of reaction. Suitable cross-linking monomers include polyacrylic and polymethacrylic esters of polyols such as butylene diacrylate and dimethacrylate, trimethylol propane trimethacrylate and the like; di- and trivinyl benzene, vinyl acrylate and methacrylate, and the like. The preferred cross-linking monomer is butylene diacrylate. The graft-linking monomer is a polyethylenically unsaturated monomer having a plurality of addition polymerizable reactive groups, at least one of which polymerizing at a substantially different rate of polymerization from at least one other of said reactive groups. The function of the graft-linking monomer is to provide a residual level of unsaturation in the elastomeric phase, particularly in the latter stages of polymerization and consequently at or near the surface of the elastomer particles. The preferred graft-linking monomer are alkyl methacrylate and dialkyl maleate.

The final stage monomer system can be comprised of $C_1$ to $C_{16}$ methacrylate, styrene, acrylonitrile, alkyl acrylates, alkyl methacrylate, dialkyl methacrylate, and the like, as long as the over Tg is at least 20° C. Preferably, the final stage monomer system is at least 50 weight percent $C_1$ to $C_4$ alkyl methacrylate. It is further preferred that the final stage polymer be free of units which tend to degrade poly(alkylene terephthalate); for example, acid, hydroxyl amino, and amide groups.

A certain such acrylic rubber interpolymer composite characterized in that acrylic rubber core is comprised of n-butyl acrylate and in that its cross-linking agent is 1,3-butylene diarylate and in which the graft-linking agent is diallyl maleate and the second phase monomeric system of which is methyl methacrylate was discovered to have an unexpected and profound effect on the impact performance of polycarbonate resins. Considerable improvement of the impact performance, manifested by an increase of the critical thickness which is indicative of a favorable shift in the ductile to brittle transition region, is obtained according to the invention by blending polycarbonate resin with relatively small amounts of an acrylic rubber interpolymer compound.

The improved level of impact performance of the compositions of the present invention is obtained without resort to any additional impact modifiers. Such impact modifiers as are known in the art may be excluded from the presently disclosed compositions and include inter-alia polyolefins and acrylate copolymers taught in U.S. Pat. No. 4,245,058 butadiene-styrene copolymers and acrylate copolymers taught in U.S. Pat. No. 4,263,415, acrylate copolymers and organic silicone compounds, taught in U.S. Pat. No. 4,263,416 olefin-acrylate copolymers and acrylate copolymers as taught in U.S. Pat. No. 4,260,693 styrene/butadiene/caprolactone block copolymers and acrylate copolymers as taught in U.S. Pat. No. 4,251,647. Further excluded from the present compositions are the particulate fillers which consist of an amorphous, alumino-silicate glass recovered from fly ash with the magnetic portion thereof removed and in the form of solid spheres having a specific gravity of about 2.4, a bulk density of about 75–80 lbs./ft.$^3$, a mass median diameter of about 5–6 microns, and a pH of about 3–8; as taught in U.S. Pat. No. 4,243,575. None of the additives listed above individually or in any combination is necessary in the practice of the present invention. In the practice of the invention the compositions of improved impact performance may comprise from about 1 phr to about 20 phr, preferably 5.5 phr to 15 phr of the acrylic rubber interpolymer composite. (phr means per one hundred resin-by weight).

Also of interest is the low temperature impact performance of these blends. Tested dart drop at −29° C., unmodified polycarbonates exhibit brittle failure whereas the blends incorporating the acrylic rubber interpolymer compound fail in a ductile fashion.

Compositions of polycarbonates and the acrylic rubber interpolymer compound have been made to incorporate fire retardants, mold release agents (polycaprolactone having a reduced vicosity of 0.7, triglycerides, pentaerythritol tetrastearate and esters of trihydric alcohols and saturated aliphatic carboxylic acid) and UV stabilizers (benzotriazole).

The invention will be illustrated, but is not intended to be limited by the following Examples.

EXAMPLES

Example 1 through 4

Bisphenol-A based polycarbonate resin, in pellet form, having a melt flow rate of 3.5[2] and a number average molecular weight of 36,000 was blended with acrylic rubber interpolymer composite and molded into test specimens. The compositional makeup of the interpolymer compound is described by the weight ratios of its constituent monomers as follows: n-butyl acrylate/1.3 butylene diacrylate/diallyl maleate/methyl methacrylate=79.2/0.4/0.4/20.0[*]. Results of the testing are presented in Table I:

[*]Acryloid® KM-330 a product of the Rohm & Haas Company of Philadelphia, Pa.

TABLE I

| Impact strength, ft.-lbs/in. | Polycarbonate Resin Control | Polycarbonates[1] | | |
|---|---|---|---|---|
| | | 5 phr | 10 phr | 15 phr |
| Notched Izod, | | | | |
| ½" specimen | 17.34 | 16.54 | 15.51 | 15.28 |
| ¼" specimen | 3.02 | 14.74 | 13.05 | 11.74 |
| Critical thickness, mils | 205 | <263 | <265 | <261 |
| Melt flow rate[2] gm/10 min. | 3.3 | 3.2 | 2.5 | 1.9 |
| Heat deflection temperature[3], °F. | 278.1 | 281.0 | 271.2 | 271.0 |
| Flexural modulus, Psi × 10$^5$ | 3.30 | 3.07 | 2.93 | 2.80 |

[1]Polycarbonate resin blended with the designated amount of Acryloid KM-330
[2]Melt flow rate at 300° C. per ASTM D1238
[3]Heat deflection temperature at 264 psi, per ASTM D648

Examples 5 through 11

Blends of pelletized bisphenol-A based polycarbonate resin of 29,000 in weight average molecular weight and having a melt flow rate of 8 g/10 minutes ASTM D1238 and Acryloid KM-330 were prepared, molded and tested as in the previously described Examples. The results of testings of these polycarbonates are reported in Table II:

TABLE II

| Impact Strength, ft-lbs/in. | Control | Polycarbonates[1] | | | | | |
|---|---|---|---|---|---|---|---|
| | | 1 phr | 2 phr | 3 phr | 4 phr | 5 phr | 10 phr |
| Notched Izod, | | | | | | | |
| ⅛" specimens | 15.31 | 15.25 | 15.20 | 14.44 | 14.7 | 14.7 | 14.38 |
| ¼" specimens | 1.96 | 2.39 | 4.80 | 12.8 | 13.18 | 12.46 | 10.5 |
| Critical thickness, mils | 164 | 178 | 231 | >250 | >250 | >250 | >250 |
| Dart drop test[2] ft. lbs. | 54.3 | 54.9 | 50.1 | 49.5 | 48.6 | 47.3 | 42.0 |
| Heat deflection temperature 264 psi, °F. | 276.6 | 275.7 | 274.8 | 273.2 | 271.4 | 271.4 | 258.1 |
| Flexural modulus, psi 10$^5$ | 3.60 | 3.66 | 3.54 | 3.49 | 3.45 | 3.43 | 3.16 |

[1]Polycarbonate resin blended with the designated amount of Acryloid KM-330.
[2]Dart drop test, ASTM D3029 modified (constant weight, variable height)

Example 12

A blend of pelletized bisphenol-A based polycarbonate resin having a melt flow rate of 3.5 (at 300° C. per ASTM D-1238) and 3 phr of acrylic rubber interpolymer composite was injection molded. Processing temperatures of 650° F. in the course of injection molding does not adversely effect the appearance or the properties of these products.

Example 13

Blends similar to the one described in Example 2 were examined as to their thermal stability. Measurements of melt viscosity, at 300° C. after 5, 35 and 65 minutes at temperature indicate the same variation as observed with unblended polycarbonate resin.

Although the invention has been described with reference to specific materials, the invention is only to be limited so far as is set forth in the accompanying claims.

What is claimed is:

1. A composition comprising a blend of about 80 to 99 percent by weight of an aromatic polycarbonate thermoplastic resin and about 1 to 20 percent by weight of a multiphase composite interpolymer comprising:
   (a) about 25 to 95 percent by weight of a first elastomeric phase polymerized from a monomer system comprising about 75 to 99.8 percent by weight $C_1$ to $C_6$ acrylate, 0.1 to 5 percent by weight crosslinking member, 0.1 to 5 percent by weight graftlinking monomer, and
   (b) about 75 to 5 percent of a second rigid thermoplastic phase polymerized in the presence of said elastomeric phase, said composition characterized in the absence of impact modifiers selected from the group consisting of acrylate copolymers, polyolefins, butadiene-styrene copolymers, organic silicone compounds, styrene/butadiene/caprolactone block copolymers and olefin-acrylate copolymers and further in the absence of spherical particulates of alumino-silicate glass therefrom.

2. The composition of claim 1 characterized in the absence of any other impact modifier therefrom.

3. The composition of claim 1 or 2 wherein said blend is of about 85 to about 94.5 phr of said resin and about 5.5 to about 15 phr of said multiphase composite interpolymer.

4. The composition of claim 1 or 2 wherein said second rigid thermoplastic phase is at least 50 weight percent $C_1$ to $C_4$ alkyl methacrylate.

5. A composition comprising a blend of about 85 to about 94.5 phr of an aromatic polycarbonate resin and about 5.5 to about 15 phr of a multiphase composite interpolymer comprising:
   (a) about 25 to 95 percent by weight of a first elastomeric phase polymerized from a monomer system comprising about 75 to 99.8 percent by weight $C_1$ to $C_6$ acrylate, 0.1 to 5 percent by weight crosslinking member, 0.1 to 5 percent by weight graftlinking monomer, and
   (b) about 75 to 5 percent of a second rigid thermoplastic phase polymerized in the presence of said elastomeric phase.

6. The composition of claim 1 or 2 or 5 wherein weight ratios of said $C_1$ to $C_6$ acrylate to said cross-linking member, to said graft-linking monomer and to said second rigid thermoplastic phase is 79.2/0.4/0.4/20.0 wherein said cross-linking member is 1.3 butylene-diacrylate, said graft-linking monomer is diallyl maleate and said second rigid thermoplastic phase is methyl methacrylate.

7. A process for improving the impact performance of polycarbonate resins comprising blending therewith the multiphase composite interpolymer defined in claim 1.

8. The composition of claim 6 wherein said acrylate is n-butyl acrylate.

9. A composition comprising a blend of about 85 to about 95.0 phr of an aromatic polycarbonate resin and about 5.0 to about 15 phr of a multiphase composite interpolymer comprising:
 (a) about 25 to 95 percent by weight of a first elastomeric phase polymerized from a monomer system comprising about 75 to 99.8 percent by weight $C_1$–$C_6$ acrylate, 0.1 to 5 percent by weight cross-linking member, 0.1 to 5 percent by weight graft-linking monomer, and
 (b) about 75 to 5 percent of a second rigid thermoplastic phase polymerized in the presence of said elastomeric phase.

* * * * *